United States Patent
Ducott et al.

(10) Patent No.: US 11,301,499 B2
(45) Date of Patent: Apr. 12, 2022

(54) SYSTEMS AND METHODS FOR PROVIDING AN OBJECT PLATFORM FOR DATASETS

(71) Applicant: Palantir Technologies Inc., Palo Alto, CA (US)

(72) Inventors: Rick Ducott, San Francisco, CA (US); Aakash Goenka, London (GB); Bianca Rahill-Marier, New York, NY (US); Tao Wei, London (GB); Diogo Bonfim Moraes Morant De Holanda, London (GB); Jack Grossman, Albuquerque, NM (US); Francis Screene, London (GB); Subbanarasimhiah Harish, London (GB); Jim Inoue, Kirkland, WA (US); Jeremy Kong, London (GB); Mark Elliot, New York, NY (US); Myles Scolnick, New York, NY (US); Quentin Spencer-Harper, London (GB); Richard Niemi, Seattle, WA (US); Ragnar Vorel, London (GB); Thomas Mcintyre, London (GB); Thomas Powell, London (GB); Andy Chen, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/892,279

(22) Filed: Jun. 3, 2020

(65) Prior Publication Data

US 2020/0293561 A1    Sep. 17, 2020

Related U.S. Application Data

(63) Continuation of application No. 15/958,853, filed on Apr. 20, 2018, now Pat. No. 10,691,729.

(Continued)

(51) Int. Cl.
*G06F 16/00* (2019.01)
*G06F 16/28* (2019.01)
(Continued)

(52) U.S. Cl.
CPC ........ *G06F 16/289* (2019.01); *G06F 16/2358* (2019.01); *G06F 16/24552* (2019.01); *G06F 16/25* (2019.01); *G06F 16/284* (2019.01)

(58) Field of Classification Search
CPC ................. G06F 16/289; G06F 16/284; G06F 16/24552; G06F 16/25; G06F 16/2358
See application file for complete search history.

(56) References Cited

U.S. PATENT DOCUMENTS 5,829,022 A * 10/1998 Watanabe ............. G06F 16/289
                                                         711/118
5,950,190 A *  9/1999 Yeager ................... G06F 16/26
(Continued)

FOREIGN PATENT DOCUMENTS

CA       2666364       5/2008
DE    102014204840     9/2014
(Continued)

OTHER PUBLICATIONS

"A Tour of Pinboard," <http://pinboard.in/tour> as printed May 15, 2014 in 6 pages.
(Continued)

*Primary Examiner* — Jared M Bibbee
(74) *Attorney, Agent, or Firm* — Sheppard Mullin Richter & Hampton LLP (57) ABSTRACT

Systems and methods are provided for providing an object platform for datasets A definition of an object may be obtained. The object may be associated with information stored in one or more datasets. The information may be determined based at least in part on the definition of the
(Continued)

object. The object may be stored in a cache such that the information associated with the object is also stored in the cache. One or more interfaces through which requests to perform one or more operations on the object are able to be submitted may be provided.

16 Claims, 5 Drawing Sheets

Related U.S. Application Data (60) Provisional application No. 62/529,818, filed on Jul. 7, 2017.

(51) Int. Cl.
*G06F 16/23* (2019.01)
*G06F 16/2455* (2019.01)
*G06F 16/25* (2019.01)

(56) References Cited

U.S. PATENT DOCUMENTS

| | | | |
|---|---|---|---|
| 6,009,271 A * | 12/1999 | Whatley | G06F 16/24552 717/127 |
| 6,289,338 B1 | 9/2001 | Stoffel et al. | |
| 6,295,541 B1 * | 9/2001 | Bodnar | G06F 16/275 |
| 6,463,404 B1 | 10/2002 | Appleby | |
| 6,523,172 B1 | 2/2003 | Martinez-Guerra et al. | |
| 6,539,538 B1 | 3/2003 | Brewster et al. | |
| 6,598,058 B2 | 7/2003 | Bird et al. | |
| 6,640,231 B1 | 10/2003 | Andersen et al. | |
| 6,748,481 B1 | 6/2004 | Parry et al. | |
| 6,789,252 B1 * | 9/2004 | Burke | G06F 8/10 717/100 |
| 6,877,137 B1 | 4/2005 | Rivette et al. | |
| 7,027,974 B1 | 4/2006 | Busch et al. | |
| 7,089,541 B2 | 8/2006 | Ungar | |
| 7,237,192 B1 | 6/2007 | Stephenson et al. | |
| 7,240,330 B2 | 7/2007 | Fairweather | |
| 7,447,709 B1 * | 11/2008 | Rozenman | G06F 16/2443 |
| 7,533,069 B2 | 5/2009 | Fairweather | |
| 7,685,083 B2 | 3/2010 | Fairweather | |
| 7,702,649 B1 * | 4/2010 | Bresch | G06F 16/86 707/999.104 |
| 7,877,421 B2 | 1/2011 | Berger et al. | |
| 7,962,495 B2 | 6/2011 | Jain et al. | |
| 8,117,022 B2 | 2/2012 | Linker | |
| 8,132,149 B2 | 3/2012 | Shenfield et al. | |
| 8,271,948 B2 | 9/2012 | Talozi et al. | |
| 8,332,354 B1 | 12/2012 | Chatterjee et al. | |
| 8,418,085 B2 | 4/2013 | Snook et al. | |
| 8,489,623 B2 | 7/2013 | Jain et al. | |
| 8,560,494 B1 | 10/2013 | Downing | |
| 8,689,182 B2 | 4/2014 | Leithead et al. | |
| 8,855,999 B1 | 10/2014 | Elliot | |
| 8,903,717 B2 | 12/2014 | Elliot | |
| 8,930,897 B2 | 1/2015 | Nassar | |
| 9,009,827 B1 | 4/2015 | Albertson et al. | |
| 9,201,920 B2 | 12/2015 | Jain et al. | |
| 9,223,773 B2 | 12/2015 | Isaacson | |
| 9,229,952 B1 | 1/2016 | Meacham et al. | |
| 9,462,056 B1 * | 10/2016 | Protopopov | H04L 67/1097 |
| 9,569,070 B1 * | 2/2017 | Ma | G06F 16/273 |
| 9,965,515 B2 * | 5/2018 | Kumar | H04L 67/2842 |
| 2002/0120428 A1 | 8/2002 | Christiaens | G06F 9/526 702/186 |
| 2002/0123978 A1 * | 9/2002 | Bird | G06F 16/284 |
| 2002/0161781 A1 * | 10/2002 | Leong | G06F 16/289 |
| 2003/0037206 A1 * | 2/2003 | Benfield | G06F 16/24552 711/133 |
| 2003/0074187 A1 | 4/2003 | Ait-Mokhtar et al. | |
| 2003/0172053 A1 | 9/2003 | Fairweather | |
| 2003/0177112 A1 | 9/2003 | Gardner | |
| 2003/0208505 A1 * | 11/2003 | Mullins | G06F 16/289 |
| 2004/0044992 A1 | 3/2004 | Muller et al. | |
| 2004/0083466 A1 | 4/2004 | Dapp et al. | |
| 2004/0221223 A1 | 11/2004 | Yu et al. | |
| 2004/0260702 A1 | 12/2004 | Cragun et al. | |
| 2005/0022208 A1 * | 1/2005 | Bolar | H04L 41/0226 719/315 |
| 2005/0039119 A1 | 2/2005 | Parks et al. | |
| 2005/0091420 A1 | 4/2005 | Snover et al. | |
| 2005/0165758 A1 * | 7/2005 | Kasten | G06F 12/128 |
| 2005/0183005 A1 | 8/2005 | Denoue et al. | |
| 2005/0235018 A1 * | 10/2005 | Tsinman | G06F 9/466 |
| 2006/0020594 A1 * | 1/2006 | Garg | G06F 16/27 |
| 2006/0271838 A1 | 11/2006 | Carro | |
| 2007/0050349 A1 | 3/2007 | Schreter et al. | |
| 2007/0074169 A1 | 3/2007 | Chess et al. | |
| 2007/0078872 A1 | 4/2007 | Cohen | |
| 2007/0112714 A1 | 5/2007 | Fairweather | |
| 2007/0233709 A1 | 10/2007 | Abnous | |
| 2008/0034327 A1 | 2/2008 | Cisler et al. | |
| 2008/0140387 A1 | 6/2008 | Linker | |
| 2008/0148398 A1 | 6/2008 | Mezack et al. | |
| 2008/0228467 A1 | 9/2008 | Womack et al. | |
| 2008/0281580 A1 | 11/2008 | Zabokritski | |
| 2009/0024652 A1 * | 1/2009 | Thompson | G06F 16/252 |
| 2009/0063781 A1 * | 3/2009 | Ebersole | G06F 16/24552 711/141 |
| 2009/0172821 A1 | 7/2009 | Daira et al. | |
| 2009/0177962 A1 | 7/2009 | Gusmorino et al. | |
| 2009/0228507 A1 | 9/2009 | Jain et al. | |
| 2009/0254970 A1 | 10/2009 | Agarwal et al. | |
| 2010/0011282 A1 | 1/2010 | Dollard et al. | |
| 2010/0138388 A1 * | 6/2010 | Wakeling | G06F 16/283 707/634 |
| 2010/0204983 A1 | 8/2010 | Chung et al. | |
| 2010/0257015 A1 | 10/2010 | Molander | |
| 2010/0257515 A1 | 10/2010 | Bates et al. | |
| 2010/0306285 A1 | 12/2010 | Shah et al. | |
| 2010/0313119 A1 | 12/2010 | Baldwin et al. | |
| 2011/0213791 A1 | 9/2011 | Jain et al. | |
| 2011/0258216 A1 | 10/2011 | Supakkul et al. | |
| 2011/0258639 A1 * | 10/2011 | Walsky | H04L 67/10 719/316 |
| 2012/0137235 A1 | 5/2012 | Ts et al. | |
| 2012/0191446 A1 | 7/2012 | Binsztok et al. | |
| 2012/0221553 A1 | 8/2012 | Wittmer et al. | |
| 2012/0304150 A1 | 11/2012 | Leithead et al. | |
| 2013/0024268 A1 | 1/2013 | Manickavelu | |
| 2013/0086482 A1 | 4/2013 | Parsons | |
| 2013/0091084 A1 | 4/2013 | Lee | |
| 2013/0124193 A1 | 5/2013 | Holmberg | |
| 2013/0225212 A1 | 8/2013 | Khan | |
| 2013/0246560 A1 | 9/2013 | Feng et al. | |
| 2013/0251233 A1 | 9/2013 | Yang et al. | |
| 2013/0275446 A1 | 10/2013 | Jain et al. | |
| 2013/0325950 A1 * | 12/2013 | Laden | H04L 67/1095 709/204 |
| 2014/0019423 A1 | 1/2014 | Leinsberger et al. | |
| 2014/0040286 A1 * | 2/2014 | Bane | G06F 16/164 707/754 |
| 2014/0047319 A1 | 2/2014 | Eberlein | |
| 2014/0164828 A1 * | 6/2014 | Banikazemi | G06F 11/1004 714/15 |
| 2014/0244388 A1 | 8/2014 | Manouchehri et al. | |
| 2015/0046481 A1 | 2/2015 | Elliot | |
| 2015/0100559 A1 | 4/2015 | Nassar | |
| 2015/0142766 A1 | 5/2015 | Jain et al. | |
| 2015/0261847 A1 | 9/2015 | Ducott et al. | |
| 2015/0363303 A1 * | 12/2015 | Argenti | G06F 9/4856 717/131 |
| 2016/0335191 A1 * | 11/2016 | Dong | G06F 12/0891 |
| 2017/0091215 A1 * | 3/2017 | Beard | G06F 16/184 |
| 2017/0315882 A1 * | 11/2017 | Yammine | G06F 9/466 |

FOREIGN PATENT DOCUMENTS

| | | |
|---|---|---|
| DE | 102014215621 | 2/2015 |
| EP | 2221725 | 8/2010 |

(56) References Cited

FOREIGN PATENT DOCUMENTS

| EP | 2778913 | 9/2014 |
|---|---|---|
| EP | 2778914 | 9/2014 |
| EP | 2778986 | 9/2014 |
| EP | 2911078 | 8/2015 |
| EP | 3018553 | 5/2016 |
| GB | 2366498 | 3/2002 |
| GB | 2513007 | 10/2014 |
| GB | 2518745 | 4/2015 |
| NL | 2011642 A | 4/2014 |
| NL | 2013306 A | 2/2015 |
| WO | WO-200235376 | 5/2002 |
| WO | WO-2003060751 | 7/2003 |
| WO | WO-2008064207 | 5/2008 |
| WO | WO-2011071833 | 6/2011 |

OTHER PUBLICATIONS

Anonymous, "BackTult—JD Edwards One World Version Control System," printed Jul. 23, 2007 in 1 page.

Delicious, <http://delicious.com/> as printed May 15, 2014 in 1 page.

Johnson, Maggie, "Introduction to YACC and Bison".

Kahan et al., "Annotea: An Open RDF Infrastructure for Shared Web Annotations", Computer Networks, Elsevier Science Publishers B.V., vol. 39, No. 5, dated Aug. 5, 2002, pp. 589-608.

Morrison et al., "Converting Users to Testers: An Alternative Approach to Load Test Script Creation, Parameterization and Data Corellation," CCSC: Southeastern Conference, JCSC 28, 2, Dec. 2012, pp. 188-196.

Niepert et al., "A Dynamic Ontology for a Dynamic Reference Work", Joint Conference on Digital Libraries, Jun. 17-22, 2007, Vancouver, British Columbia, Canada, pp. 1-10.

Palantir, "Extracting and Transforming Data with Kite," Palantir Technologies, Inc., Copyright 2010, pp. 38.

Palermo, Christopher J., "Memorandum," [Disclosure relating to U.S. Appl. No. 13/916,447, filed Jun. 12, 2013, and related applications], Jan. 31, 2014 in 3 pages.

Symantec Corporation, "E-Security Begins with Sound Security Policies," Announcement Symantec, Jun. 14, 2001.

Communication pursuant to Article 94(3) for EP Appln. No. 18182265.1 dated Apr. 9, 2020, 5 pages.

Extended European Search Report for EP Appln. No. 18182265.1 dated Oct. 29, 2018, 7 pages.

Liskov et al., "Providing Persistent Objects in Distributed Systems", Springer International Publishing, Jun. 1999, vol. 1625, pp. 230-257.

* cited by examiner

SYSTEMS AND METHODS FOR PROVIDING AN OBJECT PLATFORM FOR DATASETS

CROSS REFERENCE TO RELATED APPLICATIONS

This application is a continuation of U.S. patent application Ser. No. 15/958,853, filed Apr. 20, 2018, which claims the benefit under 35 U.S.C. § 119(e) of U.S. Provisional Application Ser. No. 62/529,818, filed Jul. 7, 2017, the content of which is incorporated by reference in its entirety into the present disclosure.

FIELD OF THE INVENTION

This disclosure relates to approaches for providing an object platform for datasets.

BACKGROUND

Under conventional approaches, data stored in relational databases may be retrieved for presentation and/or operation. However, conventional relational databases may not support object-based operations.

SUMMARY

Various embodiments of the present disclosure may include systems, methods, and non-transitory computer readable media configured to provide an object platform for datasets. A definition of an object may be obtained. The object may be associated with information stored in one or more datasets. The dataset(s) may be stored in one or more databases, such as a relational database. The information may be determined based at least in part on the definition of the object. The object may be stored in a cache such that the information associated with the object is also stored in the cache. One or more interfaces through which requests to perform one or more operations on the object are able to be submitted may be provided.

In some embodiments, the definition of the object may be included within an ontology. The ontology may define other aspects of the object, such as how the properties of the object may be presented and/or modified.

In some embodiments, the operations may include searching for the object, loading the object, or modifying the object.

In some embodiments, the object may be stored in an object store. The object may be modified within the cache and the modified object may be stored in the object store.

In some embodiments, the information in the dataset(s) may be changed. The information stored in the cache may be updated based on changes to the information in the dataset(s).

In some embodiments, a change to the definition of the object (e.g., within the ontology) may be identified. The object in the cache may be updated based on the change to the definition of the object.

In some embodiments, information about modifications to the object may be stored in a commit log. The information may include time stamps and vector clocks associated with the modifications to the object. The information may identify the user/system that prompted/made the modifications. The information may identify the security level of the user/system that prompted/made the modifications. The information may identify the priority level of the modifications.

In some embodiments, conflicts in the modifications to the object may be identified based on the commit log. The conflicts may be resolved based on one or more rules. The rule(s) may be set or configurable.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a computing system may obtain a definition of an object. The object may be associated with information stored in one or more datasets. The dataset(s) may be stored in one or more databases, such as a relational database. The information may be determined based at least in part of the definition of the object. The object may be stored in a cache such that the information associated with the object is stored in the cache. For example, the object may be associated with a set of values in one or more tables and these values may be stored in the cache as properties of the object. The information stored in the cache may be updated based on changes to the information in the dataset(s). Storing the object in the cache may enable operations on the object, such as searching, loading, and modifying the object. Such operations may be performed based on requests received through APIs (e.g., object search API, object load API, object modify API). The object may be found within the cache based on a search request. The object may be loaded based on a load request. The object may be modified based on a modification request. For example, one or more properties of the object may be modified (e.g., added, removed, changed) and/or one or more links may be created/removed/changed between the object and other objects. The object may be stored within an object store. The object may be modified within the cache and stored within the object store. The dataset(s) may be updated based on the modifications to the object in the cache.

In some embodiments, the definition of the object may be included within an ontology. The ontology may define other aspects of the object, such as how the properties of the object may be presented and/or modified. A change to the definition of the object (e.g., within the ontology) may be identified. The object in the cache may be updated based on the change to the definition of the object.

In some embodiments, information about modifications to the object may be stored in a commit log. The information may include time stamps and vector clocks associated with the modifications to the object. The information may identify the user/system that prompted/made the modifications. The information may identify the security level of the user/system that prompted/made the modifications. The information may identify the priority level of the modifications. A conflict in modifications to the object may be identified based on the commit log. The conflict may be resolved based on one or more rules. The rule(s) may be set or configurable.

The approach disclosed herein enables usage (e.g. creating, viewing, modifying) of information stored in a database via object-oriented front end. The approach disclosed herein provides a tool/service that supports object operations (e.g., searching, loading, modifying) on top of a database. Information associated with an object may be loaded into a cache (e.g., as properties of the object). Loading the object/information associated with the object into the cache may enable object-oriented operations on the object/information associated with the object. For example, particular information stored in a database may represent properties of tangible/intangible things. By loading the particular information representing the properties of the things into a cache, users may interact with the particular information in terms of things. Loading the particular information into the cache may enable users to operate on the particular information without loading the entirety of datasets and parsing the datasets for operations. Loading the particular information into the cache may enable to users to operate on the particular information using operations that are not supported by the database. In general, the approaches described herein may be adapted to provide an object platform for any dataset(s). Such dataset(s) may be stored (or ingested) in one or more databases. Many variations are possible.

Figure 1:
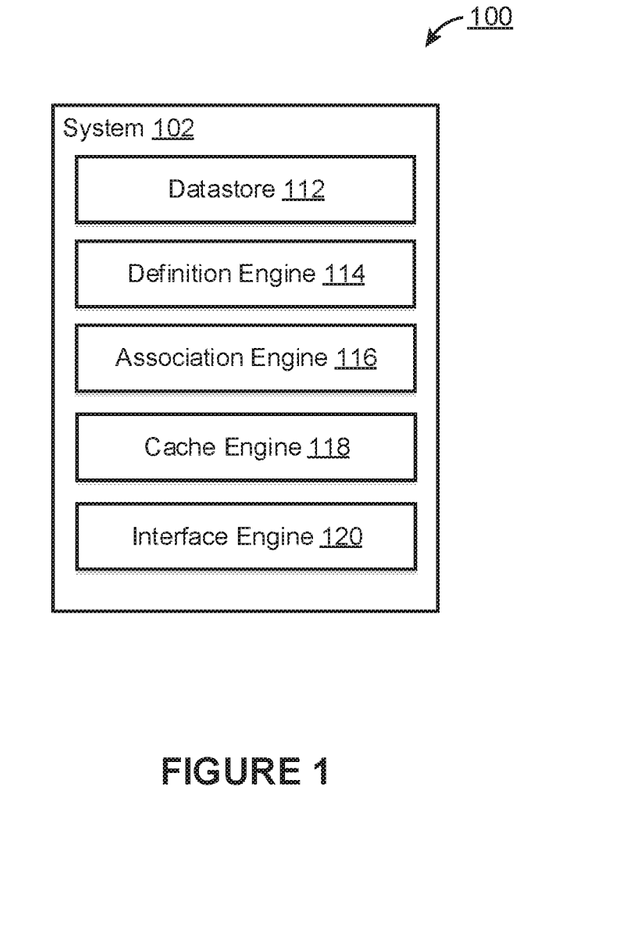
FIG. 1 illustrates an example environment for providing an object platform for datasets, in accordance with various embodiments.

FIG. 1 illustrates an example environment 100 for providing an object platform for datasets, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various datasets, databases, application functionalities, application/data packages, and/or other data that are available for download, installation, and/or execution.

In various embodiments, the computing system 102 may include a datastore 112, a definition engine 114, an association engine 116, a cache engine 118, and an interface engine 120. The datastore 112 may include structured and/or unstructured sets of data that can be divided/extracted for provisioning when needed by one or more components of the environment 100. The datastore 112 may include one or more datasets of information. The dataset(s) may be stored in one or more databases, such as a relational database. A relational database may organize information/data into tables, columns, rows, and/or other organizational groupings. Groupings of information may be linked/referenced via use of keys (e.g., primary and foreign keys). While the computing system 102 is shown in FIG. 1 as a single entity, this is merely for ease of reference and is not meant to be limiting. One or more components/functionalities of the computing system 100 described herein may be implemented in a single computing device or multiple computing devices.

The definition engine 114 may be configured to obtain one or more definitions for one or more objects. Obtaining definition(s) may include one or more of accessing, acquiring, analyzing, determining, examining, generating, locating, receiving, retrieving, reviewing, storing, and/or otherwise obtaining the definition(s). Definition(s) (previously stored/created) may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Definition(s) may be obtained from one or more user input (e.g., from a user's interaction with one or more interfaces allowing the user to define an object). For example, definition(s) may be created/modified based on user input.

An object may refer to a thing/a grouping of things with a given set of properties. An object may reference tangible/intangible thing(s) and/or animate/inanimate thing(s). As non-limiting examples, an object may refer to person(s), vehicle(s), portion(s) of a vehicle, building(s), portion(s) of a building, investigation(s), a portion(s) of an investigation, schedule(s), or right(s)/demands for right(s), and/or other things. Other types of objects are contemplated.

A definition of an object may describe the object by specifying/identifying one or more properties (e.g., characteristics) of the object. For example, an object may include a person and a definition of the object may describe the person by specifying/identifying particular properties (e.g., gender, height, weight, education, occupation, address, phone number) of the person. The values of the properties of the object may be stored in a dataset(s) (e.g., of relational databases(s)). For example, the values of the properties may be stored in one or more columns and/or rows of a database as strings, numbers, and/or other forms of expression. The definition of the object may identify the particular column(s) and/or row(s) of the database storing the relevant values of the properties of the object. In some embodiments, a given property of an object may be derived from one or more values of dataset(s). For example, a given property of an object may be determined based on multiple values within one or more tables.

In some embodiments, an object may be related to one or more other objects. Relationship among objects may be between objects of same type (e.g., relationship between people objects, such as between family members, co-workers, persons who have interacted with each other) and/or between objects of different types (e.g., relationship between a person object and a non-person object, such as between a person and a schedule, a person and an investigation). For example, objects representing individual investigations (e.g., of accidents, of claims, of demands for rights) may be related to an object representing a group of investigations (e.g., based on commonalities, based on user input). Such relationships may effectuate grouping individual investigations into groups of investigations. As another example, objects representing individual investigations (e.g., of accidents, of claims, of demands for rights) may be related to an object representing persons (e.g., persons associated with investigations). Relationships between objects may include one-to-one relationships, one-to-many relationship, many-to-one relationships, many-to-many relationships, and/or other relationships.

In some embodiments, a definition of an object may be included within an ontology. An ontology may include one or more objects/types of objects representing different things. An ontology may define other aspects of objects, such as how properties of an object may be presented and/or modified. For example, an ontology may include a person object type including a name property, and the ontology may define how the name may be presented (e.g., first name followed by last name; last name followed by first name; first initial followed by last name). The ontology may define how/whether the name may be modified (e.g., based on user input, based on user account privileges). As another example, a definition of a person object may include one or more relationship properties and the ontology may define how/whether the relationship(s) may be presented and/or modified. In some embodiments, an ontology may define whether/how properties of an object may be created and/or removed. For example, an ontology may define whether a user may add or remove one or more properties of the person object type. The definitions/ontologies may be created based on user input. The definitions/ontologies may be modified (e.g., based on user input, based on system changes).

The association engine 116 may be configured to associate one or more objects with information stored in one or more datasets. Associating object(s) with information stored in dataset(s) may include connecting/linking the object(s) with the information stored in the dataset(s). The information to be associated with object(s) may be determined based at least in part on the definition(s) of the object(s). For example, a definition of an object may specify/identify particular columns and/or rows of a dataset including relevant values of properties of the object, and the association engine 116 may associate the object with the values in the specified/identified portions of the dataset. Individual portions of the dataset may include individual values (e.g., numbers, strings) for individual properties of the object. In some embodiments, an object may be associated with multiple values of a property (e.g., a person object may be associated with multiple phone numbers). In some embodiments, an object may be associated with multiple values of a property via links between objects. For example, a phone number object may be associated with multiple values of phone numbers included in a dataset and the phone number object may be linked to a person object to associate the person object with multiple values of the phone numbers. In some embodiments, one or more associations between information and objects may be secured such that usage (e.g., viewing, modifying) of the objects/particular properties of the object may be restricted based on security/authorization level of the users/systems.

In some embodiments, the association engine 116 may be configured to change the association of an object with information stored in dataset(s) based on changes to the definition/ontology of the object. For example, a definition/ontology of an object may be changed so that the specified/identified portion of the dataset for a property of the object is changed (e.g., changed to a different column, a different row, and/or a different range). Responsive to the change in the specification/identification of the portion(s) of the dataset, the association engine 116 may update the association of the object with the changed/new information.

In some embodiments, an object may be backed by a single row/column in a dataset with a single primary key column/row. In such a case, the object may be uniquely identified by a dataset resource identifier, a branch, a primary key column/row name, and a primary key value. In some embodiments, an object may be backed by a single row/column in a dataset with a multi-column/row primary key. In such a case, one or more transforms may be used to reduce the backing to the single primary key column/row case. In some embodiments, an object may be backed by rows/columns from a single dataset or multiple datasets.

The cache engine 118 may be configured to store the object(s) in one or more caches such that the information associated with the object(s) is also stored in the cache(s). In some embodiments, the cache engine 118 may store information associated with object(s) in the cache(s) based on review of one or more commit logs. Commit logs may provide information relating to one or more changes to the information associated with object(s). Storing the information associated with an object in the cache may enable users to perform one or more operations on the object/information associated with the object. Storing the information associated with an object in the cache may enable users to perform object-oriented operations on the object/information associated with the object. For example, storing the information associated with an object in the cache may enable users to perform searching, loading, and modifying operations on the object/information associated with the object. The operations may be performed within the cache. The stored information may be used to perform operations without loading the entirety of datasets and parsing the datasets for operations. The stored information may be used to perform operations that are not supported by a database.

In some embodiments, one or more objects may be stored in an object store. An object store (e.g., via an object store server) may manage one or more objects stored in the cache(s) by the cache engine 118. In some embodiments, the object store may include one or more caches in which the object(s) are stored. Storing objects in an object store may provide users with ready access to objects that have been previously stored in a cache. In some embodiments, the objects may be modified within the cache and the modified objects may be stored in the object store. For example, based on user and/or system inputs, one or more properties/values of properties of an object may be modified within the cache. The modifications of the object/properties of the object may be propagated to the object store so that the users are provided with latest modifications to the object. In some embodiments, the object store may use version control to keep track of different versions/modifications of objects.

In some embodiments, the information in the dataset(s) may be changed. The cache engine 118 may update the information stored in the cache based on changes to the information in the dataset(s). For example, the information in the dataset(s) may include values for a name of a person. A person object (and the information associated with the person object) for the person may have been stored in a cache. After the person object has been stored in the cache, the values for the name of the person may be changed within the dataset(s) (e.g., a user correcting a misspelling of the person's name; the name being updated based on a name change). The values of the person's name in the cache may be updated based on the changes to the name in the dataset(s) so that the cache includes the modified name. Thus, the information stored in the cache may be synchronized to the changes in the underlying information in the datasets.

In some embodiments, one or more changes to a definition of an object (e.g., within the ontology) may be identified (e.g., by the definition engine 114). Changes to the definition of the object may change information to which the object is associated. Changes to information to which an object is associated may include: (1) changes in the properties specified/identified for the object (e.g., addition of a new property, removal of an existing property, change in an existing property), (2) changes in portions of the datasets from which values of the properties are obtained/derived (e.g., changes in which rows/columns are associated with the object), (3) changes in relationships of an object, and/or other changes to the object. The cache engine 118 may update the object/information associated with the object in the cache based on the changes to the definition of the object.

In some embodiments, other changes relating to objects/information associated with the object may be detected. For example, changes to other portions of an ontology (e.g., defining how/whether properties of objects may be presented and/or modified) may be detected and propagated to other parts/functionalities of the system 102. In some embodiments, one or more versions controls may be used to keep track of different versions/modifications of definitions/ontologies.

In some embodiments, information about modifications to one or more objects may be stored in one or more commit logs. Modifications to objects may include modifications to objects/information associated with objects based on (1) changes in the underlying information (e.g., changes in values of the dataset), (2) changes to definitions (e.g., changes in properties of the objects, changes in where the information for the properties are located), (3) changes based on interactions with the objects/information associated with the object in the cache, and/or other modifications. The information about modifications to the objects may include time stamps and vector clocks associated with the modifications to the objects. The information about modifications to objects may distinguish vector clocks based on where the modifications originated. For example, the vector clocks may be distinguished (e.g., via different identifiers) based on whether the modifications originated from changes in the underlying datasets (e.g., based on data transaction) or from changes made to the object in the cache based on user/system interaction with the object (e.g., based on cache transaction). Time stamps and/or vector clocks may be used to determine when the modifications were made to the objects, when conflicts exists between modifications to objects, and/or to resolve conflicts between modifications to the objects.

In some embodiments, it may be impractical to store a vector clock for every object being stored in the cache. For example, in case of large datasets/large number of objects, such storage of vector clocks may lead to storage problems. In some embodiments, instead of storing a vector clock for every object, one vector clock may be stored per dataset, and one clock may be stored per new/modified object. Such storage of vector clocks may allow for assumption of a default vector clock per dataset, with potential of additional vector clocks for modified objects.

In some embodiments, usage of vector clocks may be simplified by storing the vector clocks internally when objects are stored in a cache. A vector clock may be associated with each version of an object. When an object is modified in the cache, it may have an updated vector clock. When users make modifications to the object and the modifications are merged into the cache, the cached object may have an incremented vector clock associated with the modifications being made in the cache. When modifications of information in the dataset(s) are synchronized into the cache, the new version of the object may have the appropriate vector clock entry from the dataset transaction.

In some embodiments, the information about modifications to the objects may identify user(s)/system(s) that prompted/made the modifications. The identification of users/systems that prompted/made the modification may be used as fingerprints to determine the entity that modified the objects. In some embodiments, the information may identify security level(s) of user(s)/system(s) that prompted/made the modifications. The identification of security levels may be used to determine the types of modifications and/or which modifications may take precedence over other modifications. In some embodiments, the information may identify the priority levels of the modifications. The identification of priority levels of modifications may be used to determine the order in which the modifications may be made and/or which modifications may take precedence over other modifications.

In some embodiments, information about modifications to one or more objects may be stored in one or more commit logs before the modifications are made to the object(s). The modifications may be pushed to the objects in the cache after any conflicts/problems with the modifications have been resolved. The modifications to the objects may be stored back in the dataset(s).

In some embodiments, conflicts in the modifications to the object may be identified based on one or more commit logs. For example, while a user is modifying an object in the cache, the underlying information in the dataset(s) may be modified (e.g., by another user, by a system). The conflict in the modifications to the object may be detected based on comparison of vector clocks for the object.

The conflicts may be resolved based on one or more set and/or configurable rules. For example, conflicts may be resolved based on timing of the modifications (e.g., first to modify wins, the last to modify wins). Conflicts may be resolved based on where the modification originated (e.g., modification based on dataset transactions wins over modifications based on cache transactions, or vice versa). Conflicts may be resolved based on security levels and/or priority levels of users/systems that prompted/made the modifications. In some embodiments, conflicts arising from modifications made by multiple users may be resolved by favoring particular users over other users or requiring one or more of the users to resolve the conflict (e.g., by requiring user(s) to determine which modification to allow, by requiring users to reenter the modifications). Allowing users to modify the rules by which conflicts are resolved may enable flexible resolution strategies to be employed for different situations. In some embodiments, the resolution of a conflict may result in a resolved version of the object and a resolved vector clock, which may be stored as the new vector clock for the given object.

The interface engine 120 may be configured to provide one or more interfaces through which requests to perform one or more operations on the object(s) are able to be submitted. The interface(s) may include application program interface(s) and/or user interface(s) through which operation(s) on the objects may be submitted. For example, the interface engine 120 may provide one or more APIs that may be used by users/computing systems to search, load, and/or modify objects/information associated with the object. The object may be found within the cache based on a search request (using an object search API). The object may be loaded based on a load request (using an object load API). The object may be modified based on a modification request (using an object modify API). As another example, the interface engine 120 may provide one or more user interfaces (e.g., web user interface) through which users may enter/select commands to search, load, and/or modify objects/information associated with the object. Other operations on objects/information associated with objects are contemplated.

A search request may return one or more objects that match one or more searching criteria. Criteria for search request may include one or more parameters relating to properties of objects, reference identifiers of objects, and/or other criteria. In some embodiments, a reference identifier for an object may include one or more of a service, instance, type, and/or locator. In some embodiments, a search request may support a keyword filter (e.g., searching one or more fields of objects for specified query string/value), an object type filter (e.g., limiting the search results to a specific set of object types), a property filter (e.g., specifying query string/value to match on one or more specific properties for a specific object/object type and/or one or more global properties that multiple objects/object types may share). A search result may require matching on some or all of the specified criteria. In some embodiments, the objects in the cache may enable a full-text search and may enforce permissions/security on datasets. Individual objects may be indexed as its own document.

A load request may load one or more objects for additional operations by the users/systems. The load request may load up-to-date version of the object. On a load, a unique identifier for the object may be used.

A modification request may change one or more aspects of objects in the cache/loaded objects. A modification request may include creation, removal, and/or changes in values of the properties of the objects. A modification request may create, remove, and/or change properties of the objects. In some embodiments, creation of new properties for an object may result in creation of new information in the underlying datasets. The modifications to the objects may be made in the cache. The modifications to the objects in the cache may be propagated to the underlying datasets.

For example, a user may use the search request to locate a given object and load the given object for additional operations. The user may view particular aspects of the given object (information associated with the given object). Views of the given object may include views of information associated with objects related to the given object and/or identification of objects related to the given object. The users may modify the given object (e.g., change/remove existing properties of the object, create new properties to the object, change/remove existing relationships of the object, create new relationships of the object). The changes made by the user may be stored within the cache (e.g., in object store) and/or may be propagated to the datasets (e.g., in relational database(s)) from which the information associated with the given object is obtained.

Figure 2:
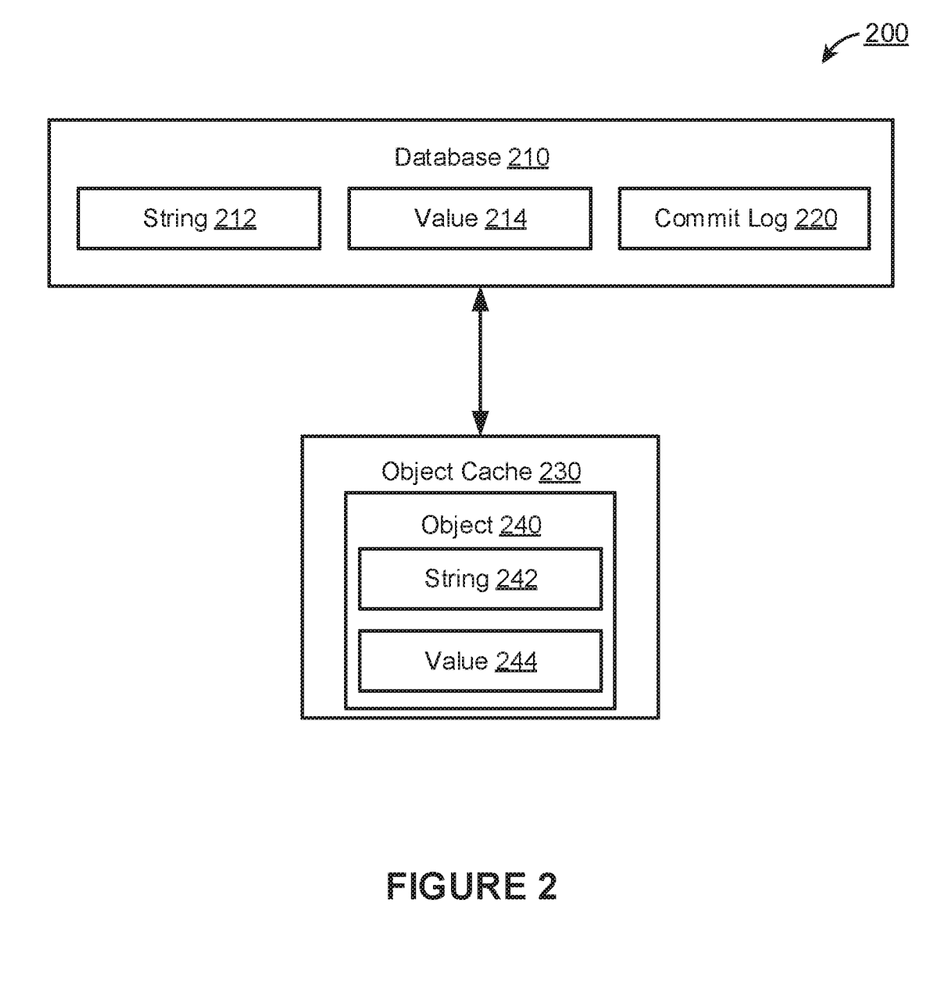
FIG. 2 illustrates an example environment for providing an object platform for datasets, in accordance with various embodiments.

FIG. 2 illustrates an example environment 200 for providing an object platform for datasets, in accordance with various embodiments. The example environment 200 may include a database 210 and an object cache 230. In some embodiments, the object cache 230 may be stored in an object store. The database 210 may include one or more databases. The database 210 may include one or more datasets including a string 212, a value 214, and/or other datasets/information. The string 212 and the value 214 may be organized into tables, columns, rows, and/or other organizational groupings. The string 214 and the value 214 may be linked/referenced via use of keys. The database may include a commit log 220. In some embodiments, the commit log 220 may be stored in other locations.

A definition for an object may specify/identify the string 212 and the value 214 as the portions of a dataset in which values of properties of the object are located. Based on the definition, the string 212 and the value 214 may be associated with the object. The object may be stored in the object cache 230 as object 240. Storing the object 240 in the object cache 230 may include storing the string 212 and the value 214 as string 242 and value 244, respectively, in the object cache 230. In some embodiments, the object 240, the string 242, and the value 244 may be stored in the object cache 230 based on a review of the commit log 220 associated with the object. In some embodiments, the storage of the object 240/the string 242, the value 244 in the object cache 230 may be implemented by one or more object store servers. Storing the object 240/the string 242, the value 244 in the object cache 230 may be part of a cache warming process. The object 240 may be queried, loaded, and/or modified via one or more interfaces (e.g., APIs, user interfaces). Changes to the string 212 and/or the value 214 in the database 210 may be propagated to the string 242 and/or the value 244 in the object cache 230. Changes to the string 242 and/or the value 244 in the object cache 230 may be propagated to the string 212 and/or the value 214 in the database 210. Information relating to the changes to the string 212, 242 and the value 214, 244 may be stored in the commit log 220.

Figure 3:
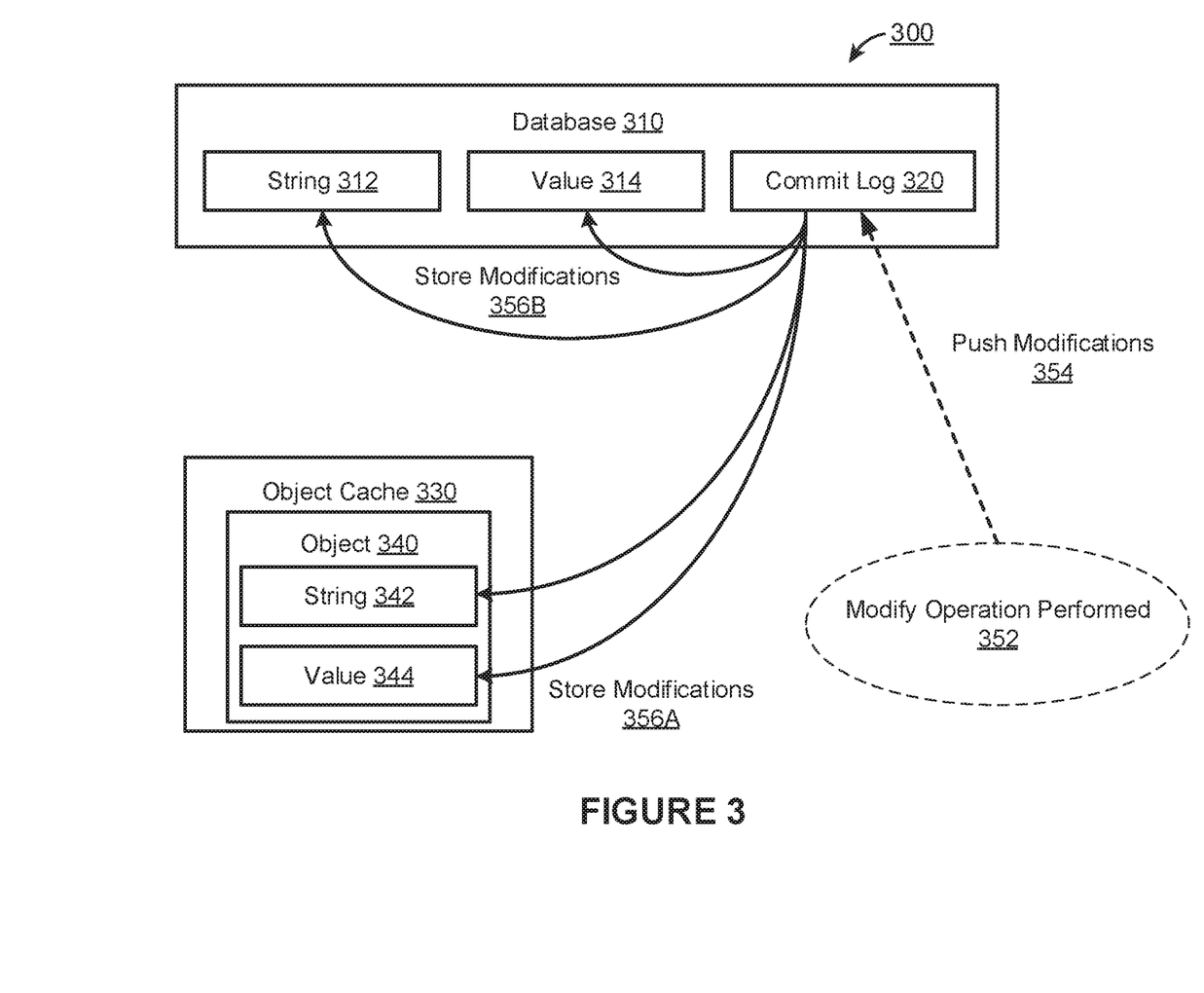
FIG. 3 illustrates an example operation flow for using an object platform for datasets, in accordance with various embodiments.

FIG. 3 illustrates an example operation flow 300 for using an object platform for datasets, in accordance with various embodiments. The operation flow 300 may include operations on a database 310 (including a string 312, a value 314, a commit log 320) and an object cache 330 (including an object 340, a string 342, a value 344). In some embodiments, the database 310 (including the string 312, the value 314, the commit log 320) may be configured to implement some, or all, of the functionalities of the database 210 (including the string 212, the value 214, the commit log 220) as described above. In some embodiments, the object cache 330 (including the object 340, the string 342, the value 344) may be configured to implement some, or all, of the functionalities of the object cache 230 (including the object 240, the string 242, the value 244) as described above.

One or more operations may be performed on the object 340 (e.g., after the object 340 has been queried and loaded). For example, as shown in FIG. 3, a modification operation 352 may be performed on the object 340 (e.g., via an object store server) to modify the string 342, the value 344, and/or other aspects of the object 340. The modifications to the object 340 may be pushed 354 to the commit log 320. In some embodiments, the commit log 320 may be used to detect and/or resolve conflicts between modifications to the object 340. The modifications to the object 340 may be stored 356A, 356B in the object cache 330 and in the database 310.

Figure 4:
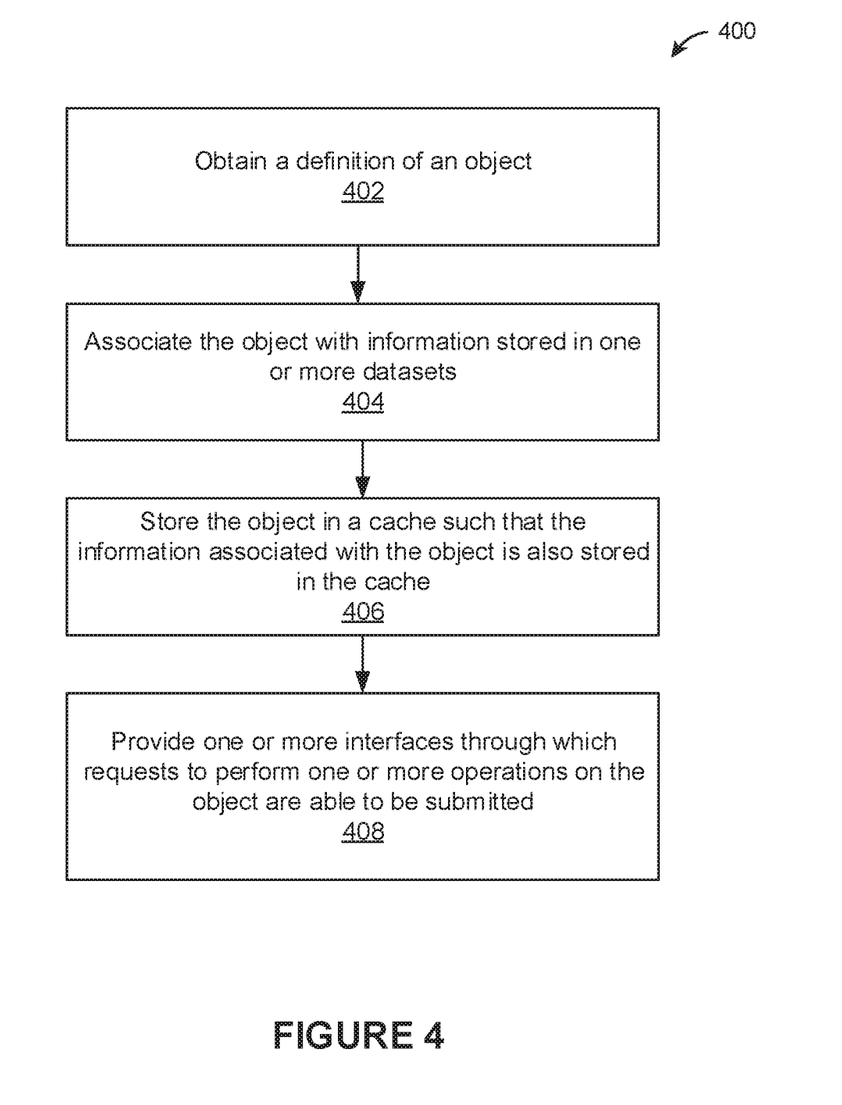
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG.

1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a definition of an object may be obtained. At block 404, the object may be associated with information stored in one or more datasets. The information may be determined based at least in part on the definition of the object. At block 406, the object may be stored in a cache such that the information associated with the object is also stored in the cache. At block 408, one or more interfaces through which requests to perform one or more operations object are able to be submitted may be provided.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
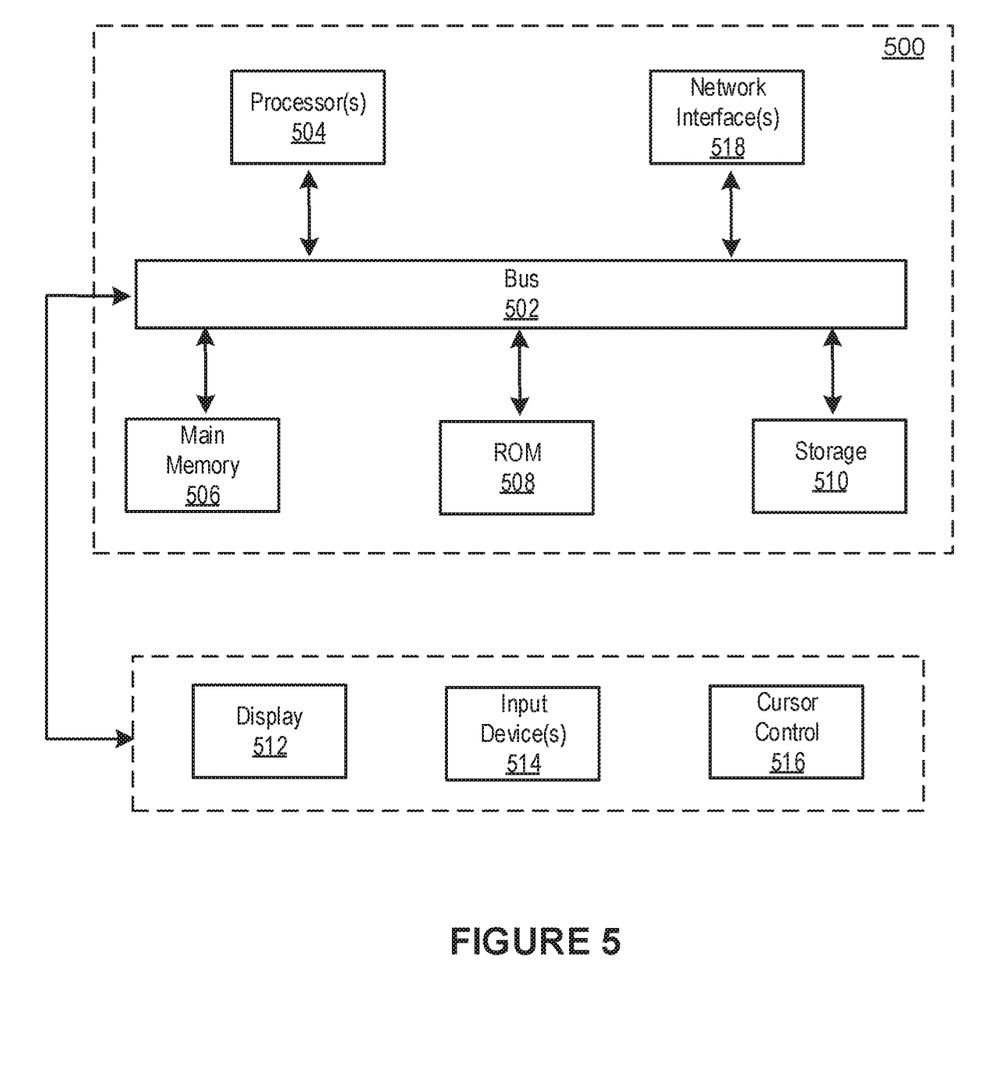
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
obtaining a definition of an object included within an ontology of an object store;
associating the object with information stored in one or more datasets of a relational database, wherein the association is based on a primary key column or a primary key row, and a primary key value corresponding to the relational database, the association further comprising:
determining whether the object is associated with only a single row or only a single column; and in response to determining that the object is associated with only a single row or only a single column, uniquely identifying the object by the primary key column or the primary key row, and the primary key value associated with the single row or the single column;

storing the object in an object cache of the object store according to the association of the object with the information stored in the one or more datasets, such that the information associated with the object is also stored in the object cache;

resolving conflicts between attempted modifications to the object based on any of respective timings of the attempted modifications, respective locations from where the attempted modifications originated, or respective security levels of systems that attempted the modifications; and modifying the object based on the resolved conflicts.

2. The system of claim 1, wherein the attempted modifications to the object are associated with vector clocks distinguished based on where the attempted modifications originated.

3. The system of claim 1, wherein the modifying the object comprises merging the modifications to the object into the cache and incrementing a vector clock associated with a previous version of the object.

4. The system of claim 1, wherein the resolving the conflicts between attempted modifications to the object comprises determining an attempted modification originating from the one or more datasets to have precedence over an attempted modification originating from the cache.

5. The system of claim 1, wherein the instructions further cause the system to perform:
storing information associated with the attempted modifications in a commit log, the information comprising:
time stamps and vector clocks associated with the attempted modifications;
the systems that attempted the modifications;
the respective security levels of the systems that attempted the modifications; and
respective priority levels of the modifications.

6. The system of claim 5, wherein the instructions further cause the system to perform:
identifying the conflicts based on the commit log.

7. The system of claim 1, wherein the attempted modifications comprise any of:
an addition, removal, or change associated with an existing property of the object;
a change in a portion of the one or more datasets from where a value of the existing property is obtained or derived; or
a change in a relationship of the object.

8. The system of claim 1, wherein the instructions further cause the system to perform:
storing only a single vector clock for each dataset; and
in response to modifying the object, storing an additional vector clock.

9. A method implemented by a computing system including one or more processors and storage media storing machine-readable instructions, wherein the method is performed using the one or more processors, the method comprising:
obtaining a definition of an object included within an ontology of an object store;
associating the object with information stored in one or more datasets of a relational database, wherein the association is based on a primary key column or a primary key row, and a primary key value corresponding to the relational database, the association further comprising:
determining whether the object is associated with only a single row or only a single column; and
in response to determining that the object is associated with only a single row or only a single column, uniquely identifying the object by the primary key column or the primary key row, and the primary key value associated with the single row or the single column;

storing the object in an object cache of the object store according to the association of the object with the information stored in the one or more datasets, such that the information associated with the object is also stored in the object cache;

resolving conflicts between attempted modifications to the object based on any of respective timings of the attempted modifications, respective locations from where the attempted modifications originated, or respective security levels of systems that attempted the modifications; and modifying the object based on the resolved conflicts.

10. The method of claim 9, wherein the attempted modifications to the object are associated with vector clocks distinguished based on where the attempted modifications originated.

11. The method of claim 9, wherein the modifying the object comprises merging the modifications to the object into the cache and incrementing a vector clock associated with a previous version of the object.

12. The method of claim 9, wherein the resolving the conflicts between attempted modifications to the object comprises determining an attempted modification originating from the one or more datasets to have precedence over an attempted modification originating from the cache.

13. The method of claim 9, further comprising:
storing information associated with the attempted modifications in a commit log, the information comprising:
time stamps and vector clocks associated with the attempted modifications;
the systems that attempted the modifications;
the respective security levels of the systems that attempted the modifications; and
respective priority levels of the modifications.

14. The method of claim 9, wherein the attempted modifications comprise any of:
an addition, removal, or change associated with an existing property of the object;
a change in a portion of the one or more datasets from where a value of the existing property is obtained or derived; or
a change in a relationship of the object.

15. The method of claim 9, further comprising:
storing only a single vector clock for each dataset; and
in response to modifying the object, storing an additional vector clock.

16. A non-transitory computer readable medium comprising instructions that, when executed, cause one or more processors to perform:
obtaining a definition of an object included within an ontology of an object store;
associating the object with information stored in one or more datasets of a relational database, wherein the association is based on a primary key column or a primary key row, and a primary key value corresponding to the relational database, the association further comprising:
  determining whether the object is associated with only a single row or only a single column;
  in response to determining that the object is associated with only a single row or only a single column, uniquely identifying the object by the primary key column or the primary key row, and the primary key value associated with the single row or the single column;
storing the object in an object cache of the object store according to the association of the object with the information stored in the one or more datasets, such that the information associated with the object is also stored in the object cache;
resolving conflicts between attempted modifications to the object based on any of respective timings of the attempted modifications, respective locations from where the attempted modifications originated, or respective security levels of systems that attempted the modifications; and
modifying the object based on the resolved conflicts.

* * * * *